United States Patent
Szentimrey et al.

(10) Patent No.: US 9,511,248 B2
(45) Date of Patent: Dec. 6, 2016

(54) SPRINKLER SYSTEM AND INSTALLATION

(75) Inventors: Rudolf Szentimrey, Nazareth, PA (US);
John M. Stempo, Bethlehem, PA (US);
Eric McWhirter, Kunkletown, PA (US)

(73) Assignee: Victaulic Company, Easton, PA (US)

( * ) Notice: Subject to any disclaimer, the term of this patent is extended or adjusted under 35 U.S.C. 154(b) by 391 days.

(21) Appl. No.: 13/206,969

(22) Filed: Aug. 10, 2011

(65) Prior Publication Data

US 2013/0037281 A1 Feb. 14, 2013

(51) Int. Cl.
*A62C 35/00* (2006.01)
*A62C 35/68* (2006.01)
*A62C 3/00* (2006.01)
*A62C 35/62* (2006.01)
*A62C 37/11* (2006.01)
*F16L 59/12* (2006.01)

(52) U.S. Cl.
CPC .............. *A62C 35/68* (2013.01); *A62C 3/004* (2013.01); *A62C 35/62* (2013.01); *A62C 37/11* (2013.01); *F16L 59/121* (2013.01)

(58) Field of Classification Search
CPC .... A62C 31/02; A62C 35/58; A62C 35/645; A62C 35/68; A62C 35/605
USPC ........ 169/16, 54, 17, 37; 239/273, 282, 283, 239/280; 285/185
See application file for complete search history.

(56) References Cited

U.S. PATENT DOCUMENTS

| | | | |
|---|---|---|---|
| 1,903,150 A * | 3/1933 | Tyden | A62C 37/12 169/17 |
| 3,031,212 A | 4/1962 | Oliver | |
| 3,125,358 A | 3/1964 | Kleinberg et al. | |
| 3,584,689 A | 6/1971 | Willms | |
| 4,071,265 A * | 1/1978 | Wallace | F16L 5/12 285/136.1 |
| 4,165,105 A | 8/1979 | Hahn | |
| 4,177,862 A | 12/1979 | Bray | |
| 4,385,777 A | 5/1983 | Logsdon | |
| 4,417,626 A * | 11/1983 | Hansen | A62C 37/09 169/37 |
| 4,918,761 A * | 4/1990 | Harbeke | 4/252.4 |
| 5,188,185 A | 2/1993 | Mears | |
| 5,228,520 A | 7/1993 | Gottschalk | |

(Continued)

FOREIGN PATENT DOCUMENTS

| AU | 2004100686 A4 | 9/2004 |
|---|---|---|
| BE | 660833 | 7/1965 |

(Continued)

OTHER PUBLICATIONS (Copenheaver, Blaine R.) PCT International Search Report and Written Opinion regarding International Application No. PCT/US2012/044147, Sep. 14, 2012.

(Continued)

*Primary Examiner* — Arthur O Hall
*Assistant Examiner* — Joel Zhou
(74) *Attorney, Agent, or Firm* — Ballard Spahr LLP

(57) ABSTRACT

A sprinkler system installation for fire suppression within a cold environment uses a dry sprinkler assembly connected to a piping network by a flexible hose and supported in a substrate of a structure separating the cold environment from a temperature controlled warm environment. Sleeves of insulating material surround a conduit of the assembly and engage both the conduit and the substrate to seal and provide support. Escutcheons are also provided on opposite sides of the substrate which effect a clamping action on the assembly.

27 Claims, 9 Drawing Sheets

(56) References Cited

U.S. PATENT DOCUMENTS

| | | | |
|---|---|---|---|
| 5,390,465 A * | 2/1995 | Rajecki | F16L 5/04 |
| | | | 285/211 |
| 5,415,239 A | 5/1995 | Kötter et al. | |
| 5,775,431 A | 7/1998 | Ondracek | |
| 5,967,240 A * | 10/1999 | Ondracek | A62C 37/14 |
| | | | 169/38 |
| 6,293,348 B1 | 9/2001 | Reilly | |
| 6,367,560 B1 | 4/2002 | de Ris et al. | |
| 6,488,097 B1 | 12/2002 | MacDonald, III et al. | |
| 6,536,533 B2 | 3/2003 | Reilly | |
| 6,566,533 B1 | 5/2003 | Barth et al. | |
| 6,666,277 B2 | 12/2003 | Reilly | |
| 6,708,771 B2 | 3/2004 | Reilly | |
| 6,752,217 B2 | 6/2004 | Reilly | |
| 6,851,482 B2 | 2/2005 | Dolan | |
| 7,143,834 B2 | 12/2006 | Dolan | |
| 7,213,319 B2 * | 5/2007 | Silva, Jr. | A62C 3/004 |
| | | | 169/17 |
| 7,373,720 B1 | 5/2008 | Jensen et al. | |
| 7,383,892 B2 | 6/2008 | Jackson | |
| 7,389,824 B2 | 6/2008 | Jackson | |
| 7,516,800 B1 | 4/2009 | Silva, Jr. et al. | |
| 7,559,376 B2 | 7/2009 | Silva, Jr. | |
| 7,802,628 B1 | 9/2010 | Silva, Jr. et al. | |
| 2002/0003042 A1 | 1/2002 | Reilly | |
| 2002/0050531 A1 | 5/2002 | Dolan | |
| 2003/0000712 A1 | 1/2003 | Franson | |
| 2003/0075343 A1 | 4/2003 | Ballard | |
| 2005/0072580 A1 | 4/2005 | Jackson | |
| 2005/0121206 A1 | 6/2005 | Dolan | |
| 2005/0173562 A1 | 8/2005 | Franson et al. | |
| 2006/0113093 A1 | 6/2006 | Silva, Jr. | |
| 2006/0113094 A1 | 6/2006 | Silva, Jr. et al. | |
| 2006/0243459 A1 | 11/2006 | Jackson | |
| 2007/0169946 A1 | 7/2007 | Cordell et al. | |
| 2007/0187116 A1 | 8/2007 | Jackson et al. | |
| 2008/0066932 A1 * | 3/2008 | MacDonald | A62C 35/68 |
| | | | 169/16 |
| 2008/0257567 A1 | 10/2008 | MacDonald et al. | |
| 2009/0211772 A1 | 8/2009 | Silva, Jr. | |
| 2009/0294138 A1 | 12/2009 | Jackson et al. | |
| 2010/0038099 A1 * | 2/2010 | Thompson | A62C 37/11 |
| | | | 169/37 |
| 2011/0215566 A1 | 9/2011 | Stempo et al. | |

FOREIGN PATENT DOCUMENTS

| | | |
|---|---|---|
| CN | 2044882 U | 9/1989 |
| CN | 1429127 A | 7/2003 |
| CN | 2732281 Y | 10/2005 |
| DE | 20117370 U1 | 3/2002 |
| GB | 1159606 | 7/1969 |
| GB | 1249113 | 10/1971 |
| JP | S57-079555 | 5/1982 |
| JP | S63-130076 | 6/1988 |
| JP | 2000-153908 | 6/2000 |
| WO | 2006058330 A2 | 6/2006 |

OTHER PUBLICATIONS

Zupancic, Gregor; Supplementary European Search Report from corresponding European patent application No. EP 12822047; Apr. 7, 2015; pp. 1-3; European Patent Office, Munich, Germany.

Zupancic, Gregor; Search Opinion from corresponding European patent application No. EP 12822047; Apr. 7, 2015; pp. 1-6; European Patent Office, Munich, Germany.

Iijima, Hisao; Office Action from counterpart Japanese patent application No. 2014-525014; Feb. 24, 2016; pp. 1-4, Japanese Patent Office, Chiyoda-ku, Tokyo, Japan.

Author Unknown; English translation of Office Action from counterpart Japanese patent application No. 2014-525014, Feb. 24, 2016; pp. 1-6, prepared by Shusaku Yamamoto Patent Attorneys, Osaka, Japan.

* cited by examiner

SPRINKLER SYSTEM AND INSTALLATION

FIELD OF THE INVENTION

This invention concerns sprinkler systems and installations at the interface between environments having large temperature differences.

BACKGROUND

Sprinkler systems for fire suppression are used to protect structures which separate or enclose adjacent regions having large temperature differences from one another. Examples of such structures include freezers, balconies of apartments, and loading docks of warehouses. Each of these structures has one or more walls and/or ceilings, which separate a region wherein the temperature is maintained above the freezing point of water from a region where the temperature is maintained below freezing or can drop below freezing.

It is a challenge to provide fire protection to such structures, especially when water is the preferred fire suppressing liquid because measures must be taken to ensure that the water does not freeze within the piping network or the sprinklers. To meet this challenge it is known to position the piping network in the temperature controlled "warm" environment where water within the pipes will not freeze, and to provide "dry" type sprinkler assemblies which extend from the piping network through openings in the ceiling or walls of the structure and into the "cold" or uncontrolled environment. An example of such a dry type sprinkler assembly is disclosed in U.S. Pat. No. 5,967,240, hereby incorporated by reference. Such dry sprinkler assemblies have elongated conduits extending between the sprinkler and the piping network with a valve inside to maintain the sprinkler assembly in a "dry" state, i.e., without water, until the sprinkler is activated by the heat from a fire. A heat sensitive trigger, for example a liquid filled frangible bulb, which breaks when subjected to heat from a fire, opens the sprinkler to permit discharge of the water and also acts to open the valve and allow water to flow from the piping network through the conduit and out through the sprinkler.

In prior art sprinkler systems the dry sprinkler assemblies are rigidly connected to the piping network and therefore do not require supplemental support when they extend through the wall or ceiling of the structure into the cold or uncontrolled environment. However, this rigid design is unforgiving with respect to the relative positioning of the openings and the dry sprinkler assemblies, requiring precise alignment between assembly and opening during construction and installation. It would be advantageous to permit flexibility between the dry sprinkler assembly and the piping network so that a greater variation between opening and sprinkler assembly position could be tolerated, thereby simplifying the design and construction of such systems.

SUMMARY OF THE INVENTION

The invention concerns a sprinkler assembly connectable in fluid communication with a piping network carrying a fire suppressing liquid. The sprinkler assembly is extendable through an opening in a substrate. The sprinkler assembly comprises a conduit having a first end connectable to the piping network on one side of the substrate and a second end positionable adjacent to an opposite side of the substrate. A valve associated with the assembly is movable between a closed position to prevent the liquid from entering the conduit, and an open position to allow the liquid to flow through the conduit. In one embodiment the valve is positioned within the conduit. A sprinkler is mounted on the second end of the conduit. A sleeve is positioned within the opening and surrounding the conduit.

In one embodiment, the sleeve is positioned proximate to the first end of the conduit. A portion of the sleeve may extend from the opening. The assembly further comprises an escutcheon positioned on the one side of the substrate and surrounding the opening. The escutcheon may engage the portion of the sleeve extending from the opening.

The assembly may further comprise an escutcheon positioned on the one side of the substrate and surrounding the opening, wherein the escutcheon is mounted on the conduit, for example by screw threads.

Alternately a clamp may engage the conduit and be positioned adjacent to the escutcheon.

A sleeve may also be positioned proximate to the second end of the conduit. A portion of the sleeve may extend from the opening. In this embodiment the assembly may further comprise an escutcheon positioned on the opposite side of the substrate and surrounding the opening, the escutcheon engaging the portion of the sleeve. The escutcheon may mounted on the conduit, for example by screw threads, or a clamp may engage the conduit for attaching the escutcheon to it. Alternately, the escutcheon may be mounted on the sprinkler.

The sleeves may have an inwardly facing surface in contact with an outwardly facing surface of the conduit, and an outwardly facing surface in contact with an inwardly facing surface of the substrate within the opening. Preferably the outwardly facing surface of the sleeves are tapered. The assembly may further comprise a flexible hose attached to the first end of the conduit for connecting the conduit to the piping network.

In another embodiment of a sprinkler assembly connectable in fluid communication with a piping network carrying a fire suppressing liquid, the sprinkler assembly being extendable through an opening in a substrate, the sprinkler assembly comprises a conduit having a first end connectable to the piping network on one side of the substrate and a second end positionable adjacent to an opposite side of the substrate. A valve associated with the assembly is movable between a closed position to prevent the liquid from entering the conduit, and an open position to allow the liquid to flow through the conduit. In one embodiment the valve is positioned within the conduit. A sprinkler is mounted on the second end of the conduit. A first sleeve is positioned within the opening and surrounding the conduit. The first sleeve is positioned proximate to the first end of the conduit. A second sleeve is positioned within the opening and surrounding the conduit. The second sleeve is positioned proximate to the second end of the conduit.

The invention further encompasses a freezer, comprising a compartment defined by a plurality of interconnected substrates. A piping network is positioned outside of the compartment and supplies a fire suppressing liquid. The freezer includes at least one sprinkler assembly comprising a conduit extending through an opening in one of the substrates. The conduit has a first end connected to the piping network on one side of the one substrate and a second end positioned adjacent to an opposite side of the one substrate. A valve associated with the assembly is movable between a closed position to prevent the liquid from entering the conduit, and an open position to allow the liquid to flow through the conduit. In one embodiment the valve is positioned within the conduit. A sprinkler is mounted on the second end of the conduit and a sleeve is positioned within the opening and surrounding the conduit.

In an alternate embodiment the freezer comprises a compartment defined by a plurality of interconnected substrates. A piping network is positioned outside of the compartment and supplies a fire suppressing liquid. The sprinkler includes at least one sprinkler assembly comprising a conduit extending through an opening in one of the substrates. The conduit has a first end connected to the piping network on one side of the one substrate and a second end positioned adjacent to an opposite side of the one substrate. A valve associated with the assembly is movable between a closed position to prevent the liquid from entering the conduit, and an open position to allow the liquid to flow through the conduit. In one embodiment the valve is positioned within the conduit. A sprinkler is mounted on the second end of the conduit. A first sleeve is positioned within the opening and surrounding the conduit, the first sleeve being positioned proximate to the first end of the conduit. A second sleeve is positioned within the opening and surrounding the conduit, the second sleeve being positioned proximate to the second end of the conduit.

The invention also includes a sprinkler installation, comprising a structure comprising a temperature controlled interior space and an exterior space separated from one another by a substrate. A piping network is positioned within the temperature controlled interior space and supplies a fire suppressing liquid. The installation includes at least one sprinkler assembly comprising a conduit extending through an opening in the substrate. The conduit has a first end connected to the piping network and a second end positioned adjacent to the exterior space. A valve associated with the assembly is movable between a closed position to prevent the liquid from entering the conduit, and an open position to allow the liquid to flow through the conduit. In one embodiment the valve is positioned within the conduit. A sprinkler is mounted on the second end of the conduit and extends into the exterior space. A first sleeve is positioned within the opening and surrounding the conduit. The first sleeve is positioned proximate to the first end of the conduit. A second sleeve is positioned within the opening and surrounding the conduit. The second sleeve is positioned proximate to the second end of the conduit.

DETAILED DESCRIPTION

Figure 1:
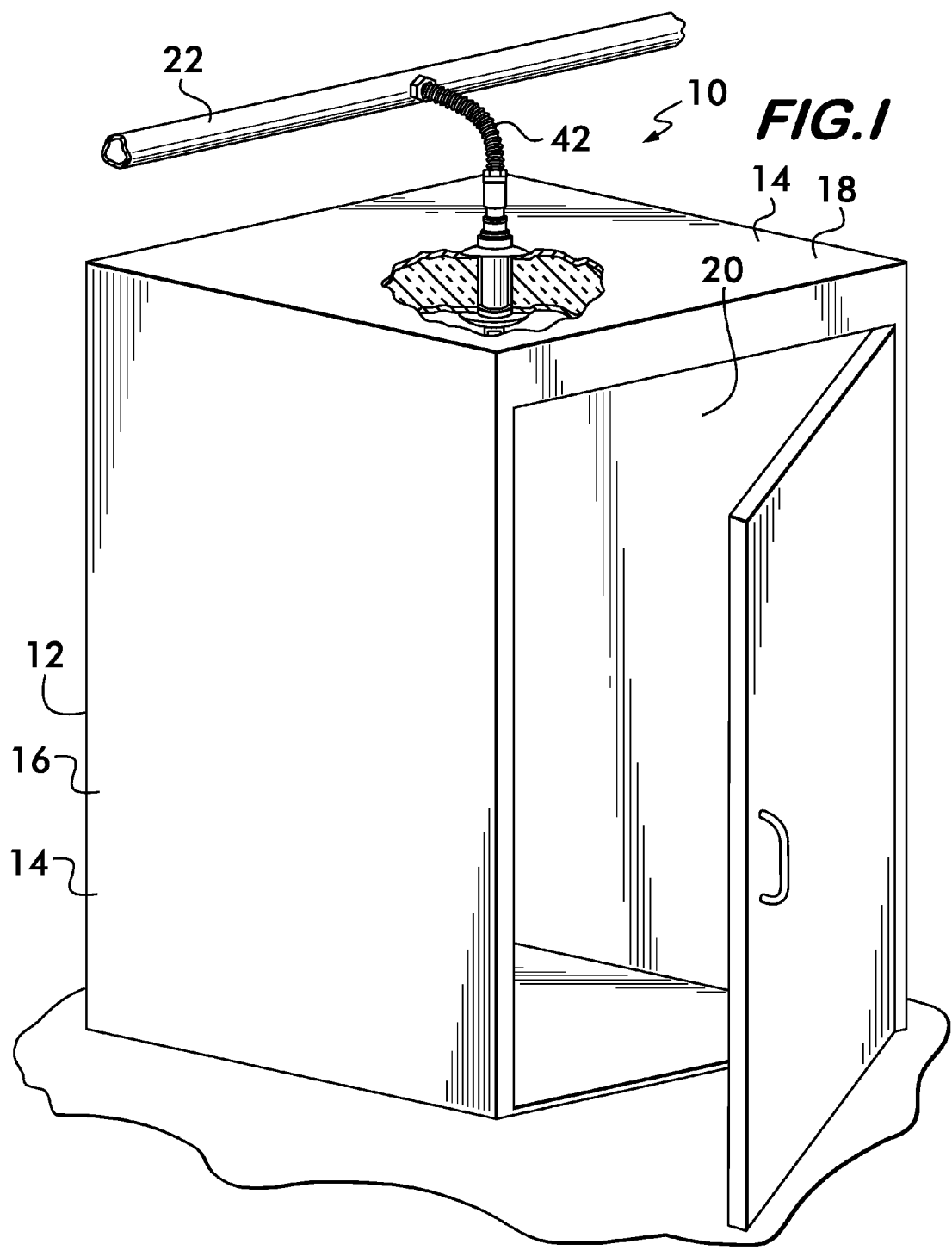
FIG. 1 is a partial cut-away isometric view of a freezer sprinkler installation according to the invention.

FIG. 1 shows a sprinkler assembly 10 installed in a freezer 12 for fire protection. Freezer 12 comprises a plurality of substrates 14, in this example forming walls 16 and ceiling 18 interconnected to define a compartment 20. A piping network 22 is positioned outside of the compartment and supplies a fire suppressing liquid, for example, water, to the sprinkler assembly. The freezer 12 may be located within a building, such as a climate controlled warehouse, wherein the ambient temperature is maintained so that water or other fire suppressing liquid in the piping network 22 does not freeze.

Figure 2:
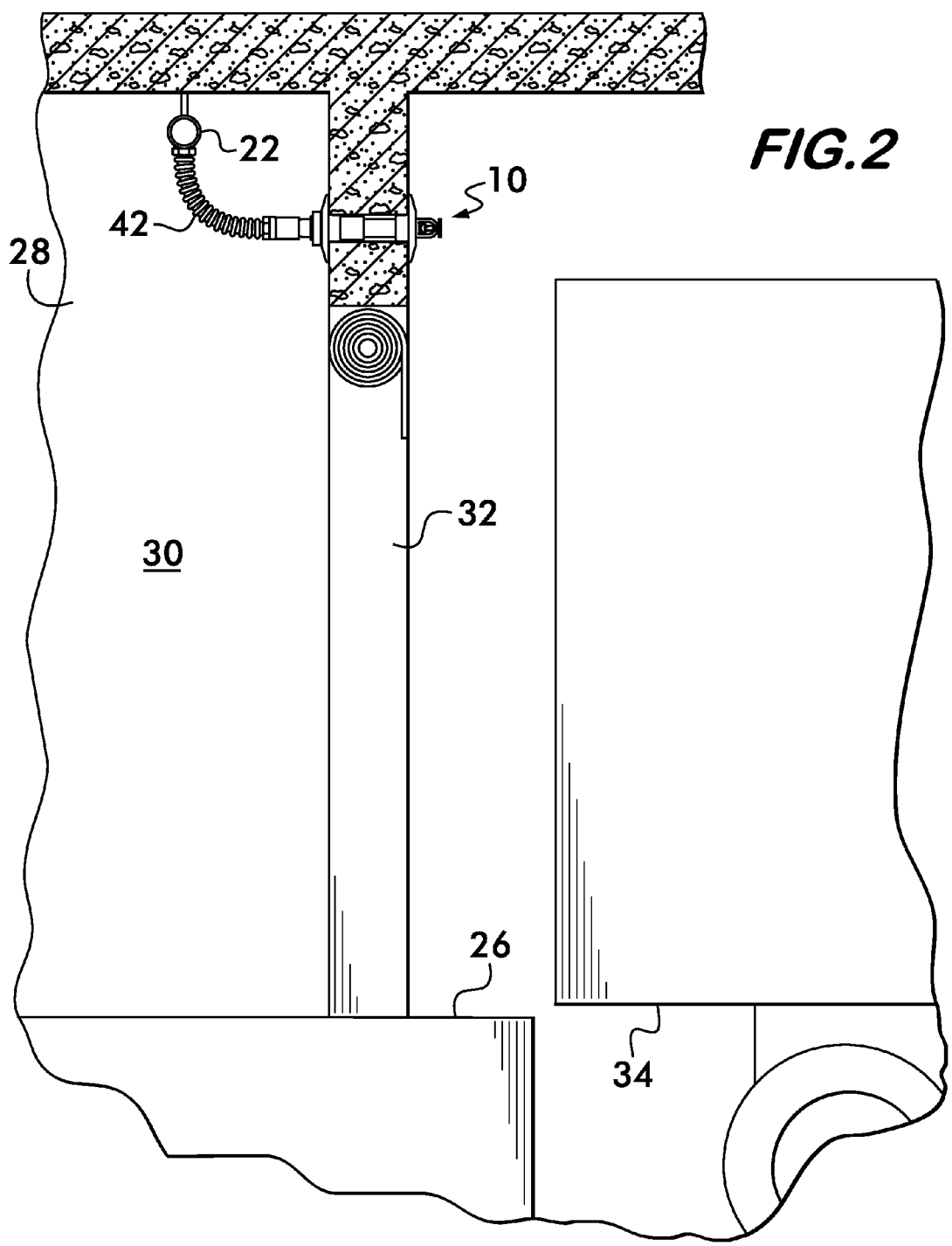
FIG. 2 is a partial sectional elevational view of a sprinkler installation according to the invention.

FIG. 2 shows another example sprinkler installation, in this embodiment, a loading dock 26 of a warehouse 28. The warehouse 28 comprises a temperature controlled interior space 30 defined by a substrate 32 (the exterior wall of the warehouse). The piping network 22 is positioned within the interior space, and the loading dock 26 comprises an exterior space (not temperature controlled) which receives trucks 34 for pick-up and delivery of goods. The local exterior space of the loading dock is protected by the sprinkler assembly 10 according to the invention. It is understood that other similar installations are also feasible, for example a balcony of an apartment, comprising an exterior space where temperature control is not practical, is protected by a sprinkler assembly partially housed in a neighboring interior space (the apartment) which is climate controlled.

Figure 3:
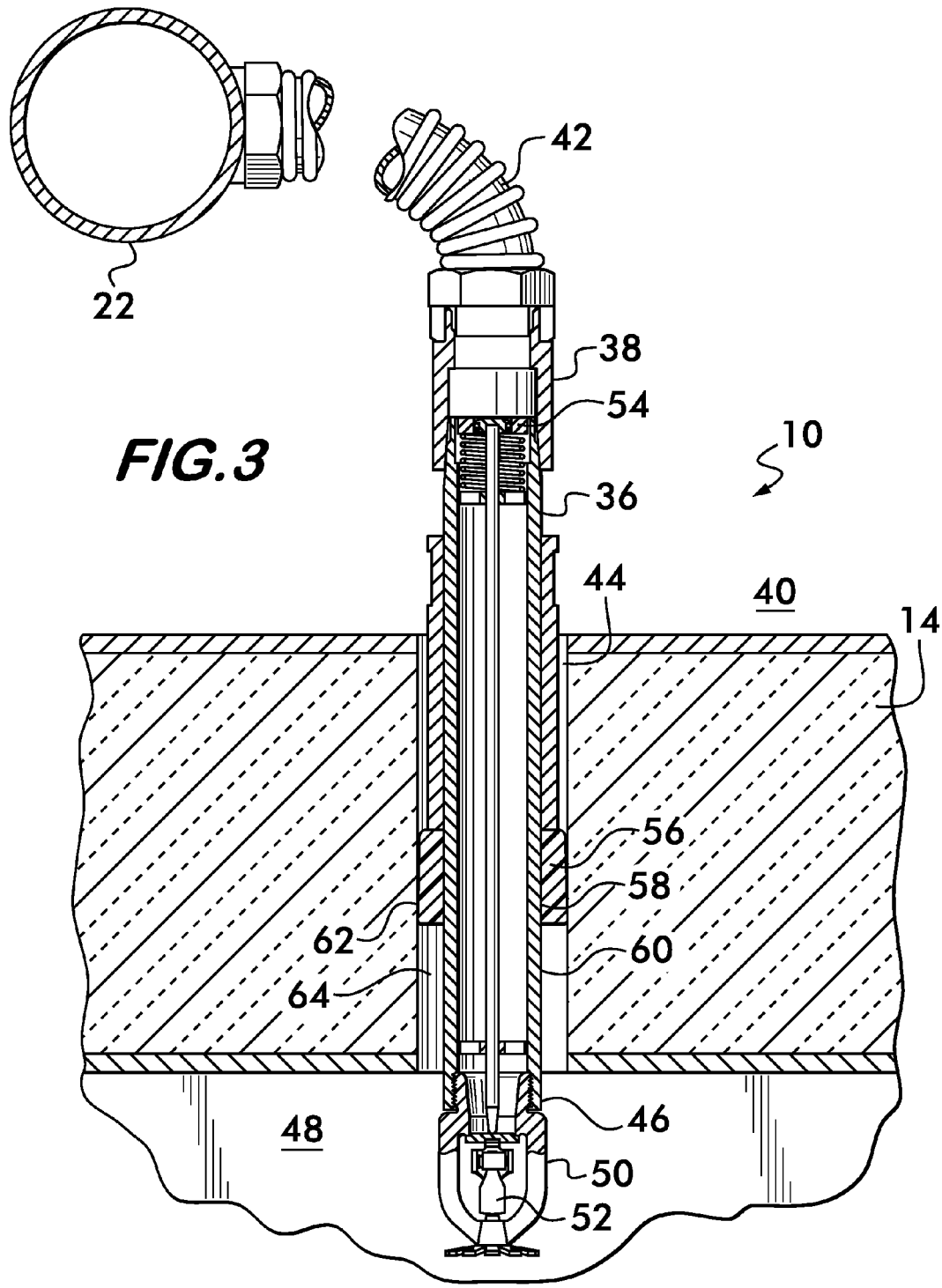
FIG. 3 is a sectional view of an example embodiment of a sprinkler assembly according to the invention.

FIG. 3 shows in detail an example embodiment of the sprinkler assembly 10 according to the invention. Assembly 10 comprises a conduit 36 having a first end 38 connectable to the piping network 22 on one side 40 of the substrate 14. Connection to the piping network is advantageously effected by a flexible hose 42, which could be, for example, a corrugated metal hose or a hose comprising a braided outer sleeve surrounding a flexible inner tubular member. Conduit 36 extends through an opening 44 in the substrate 14 and has a second end 46 positioned adjacent to an opposite side 48 of the substrate 14. The second end 46 of conduit 36 may extend proud of the substrate as shown, or it may be flush with or beneath the surface of the opposite side 48. A sprinkler 50 is mounted on the second end 46 of the conduit 36. The sprinkler has a heat sensitive trigger 52 which operates to open the assembly and allow water or other fire suppressing liquid to flow from the piping network 22 to the sprinkler for discharge onto a fire. Because the second end 46 of conduit 36 is exposed to a cold environment, for example within a freezer compartment, or on the outside of a building, the conduit is normally maintained in a dry state, i.e., without water, to prevent freezing within the conduit. A valve 54, an example of which is described in detail below, may be positioned within the conduit 36, and keeps the water within the flexible hose 42 (and within the temperature controlled warm environment) until a fire causes the heat sensitive trigger to open the sprinkler, which also opens the valve 54 and thereby allow water to flow through the conduit 36 to the sprinkler 50.

It is advantageous to support the sprinkler assembly 10 within the substrate, as it has significant weight which may not be properly supported from the piping network 22 by the flexible hose 42. To that end a sleeve 56 is positioned within the opening 44 surrounding the conduit 36. Sleeve 56 may be formed of an insulating material such as natural rubber, EPDM, Buna N, PTFE, silicone, cork or other similar materials. The sleeve 56 has an inwardly facing surface 58 that is in contact with an outwardly facing surface 60 of the conduit 36. The sleeve also has an outwardly facing surface 62 which contacts an inwardly facing surface 64 within the opening 44 of the substrate 14. Friction between the various surfaces supports the conduit, and thus the sprinkler assembly 10 in the substrate 14. Outwardly facing surface 62 of sleeve 56 may be tapered as shown to facilitate insertion of the sleeve into the opening 44. Sleeve 56 may be longer or shorter than the example shown, as required for effective support of the sprinkler assembly, and may also be positioned anywhere along the length of the conduit 36 within the opening 44.

Figure 4A:
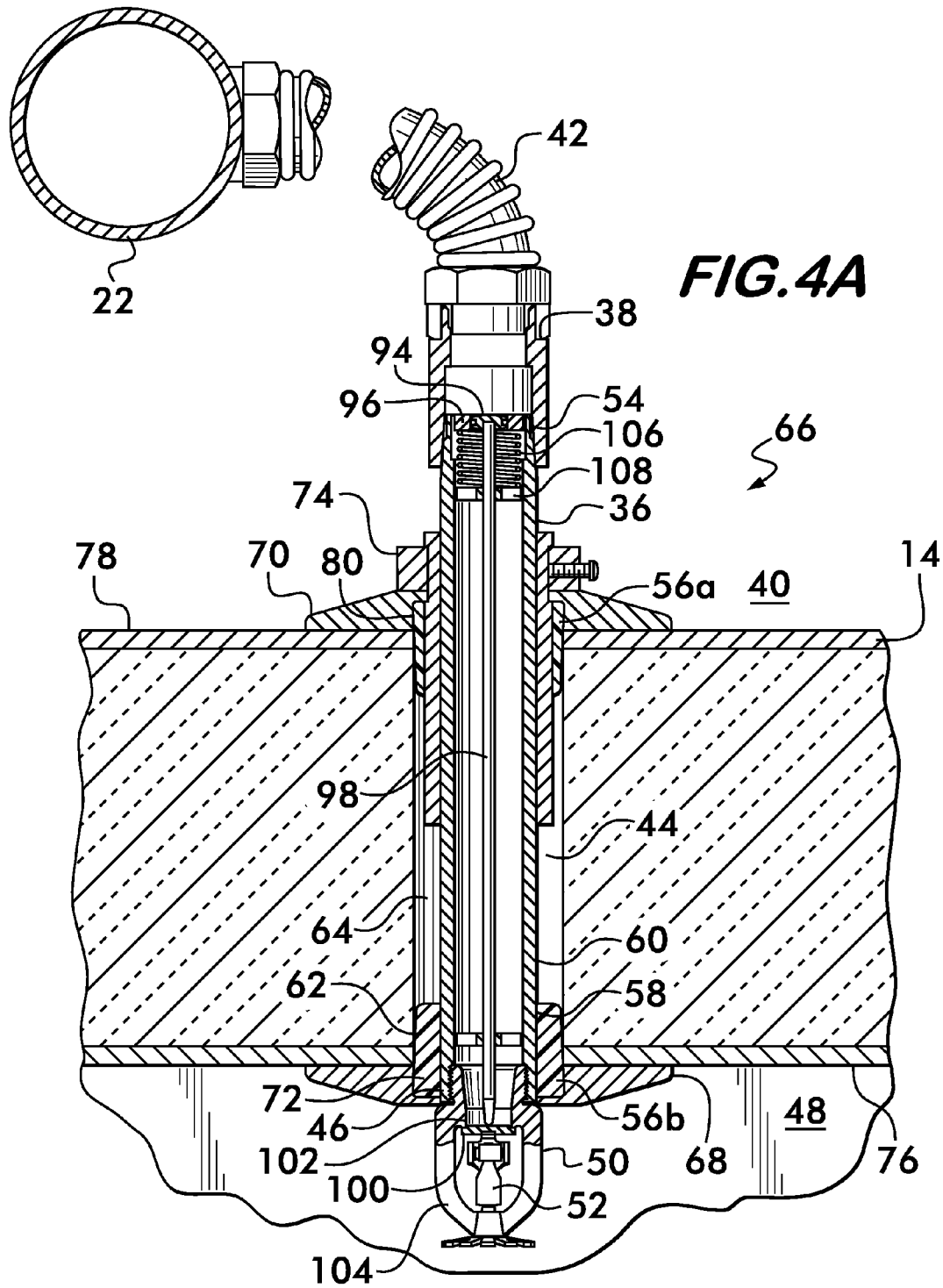
FIGS. 4A and 4B are sectional views of another example embodiment of a sprinkler assembly according to the invention.

FIG. 4A shows another embodiment 66 of a sprinkler assembly according to the invention having a first sleeve 56a positioned proximate to the first end 38 of the conduit 36 and a second sleeve 56b positioned proximate to the second end 46 of the conduit. Again, the sleeves may be formed of insulating material such as natural rubber, EPDM, Buna N, PTFE, silicone, cork or other similar materials. As described above, each sleeve 56a and 56b may have an inwardly facing surface 58 which contacts the outwardly facing surface 60 of the conduit, and an outwardly facing surface 62 which contacts an inwardly facing surface 64 of the substrate 14 within the opening 44. Outwardly facing surfaces 62 of sleeves 56a and 56b may be tapered, and the sleeves cooperate to support the sprinkler assembly on the substrate.

Additional support for the sprinkler assembly 66 is provided by a pair of escutcheons 68 and 70 positioned surrounding the opening 44 on opposite sides of the substrate 14. In this example, escutcheon 68 is positioned proximate to the second end 46 of the conduit 36 and is retained to the assembly by engagement with the sprinkler 50. Note that a portion 72 of second sleeve 56b extends from the opening 44 and is engaged by the escutcheon 68. Escutcheon 70 is positioned proximate to the first end 38 of conduit 36 and is mounted on the conduit. In the example shown in FIG. 4A, the escutcheon 70 is retained to the conduit by a clamp 74, which may be integral with the escutcheon or, as shown, a separate component. Tightening of the clamp 74 cinches it to the conduit and thereby fixes the escutcheons 68 and 70 in contact with respective surfaces 76 and 78 on opposite sides 48 and 40 of the substrate 14 to provide support to the assembly 66. A portion 80 of first sleeve 56a extends from opening 44 and is engaged by the escutcheon 70.

Figure 5:
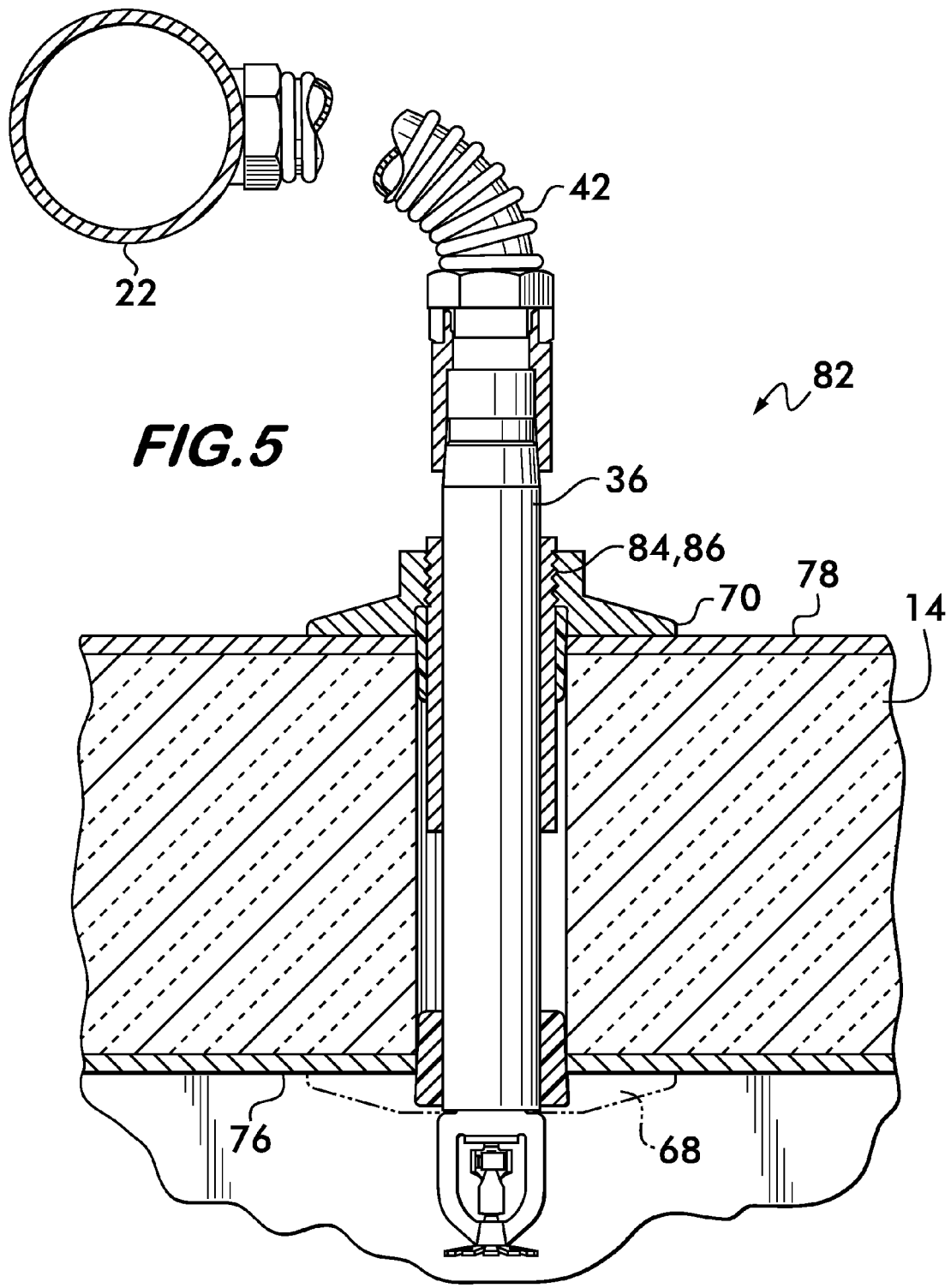
FIGS. 5 through 8 are sectional views of example embodiments of sprinkler assemblies according to the invention.
Figure 6:
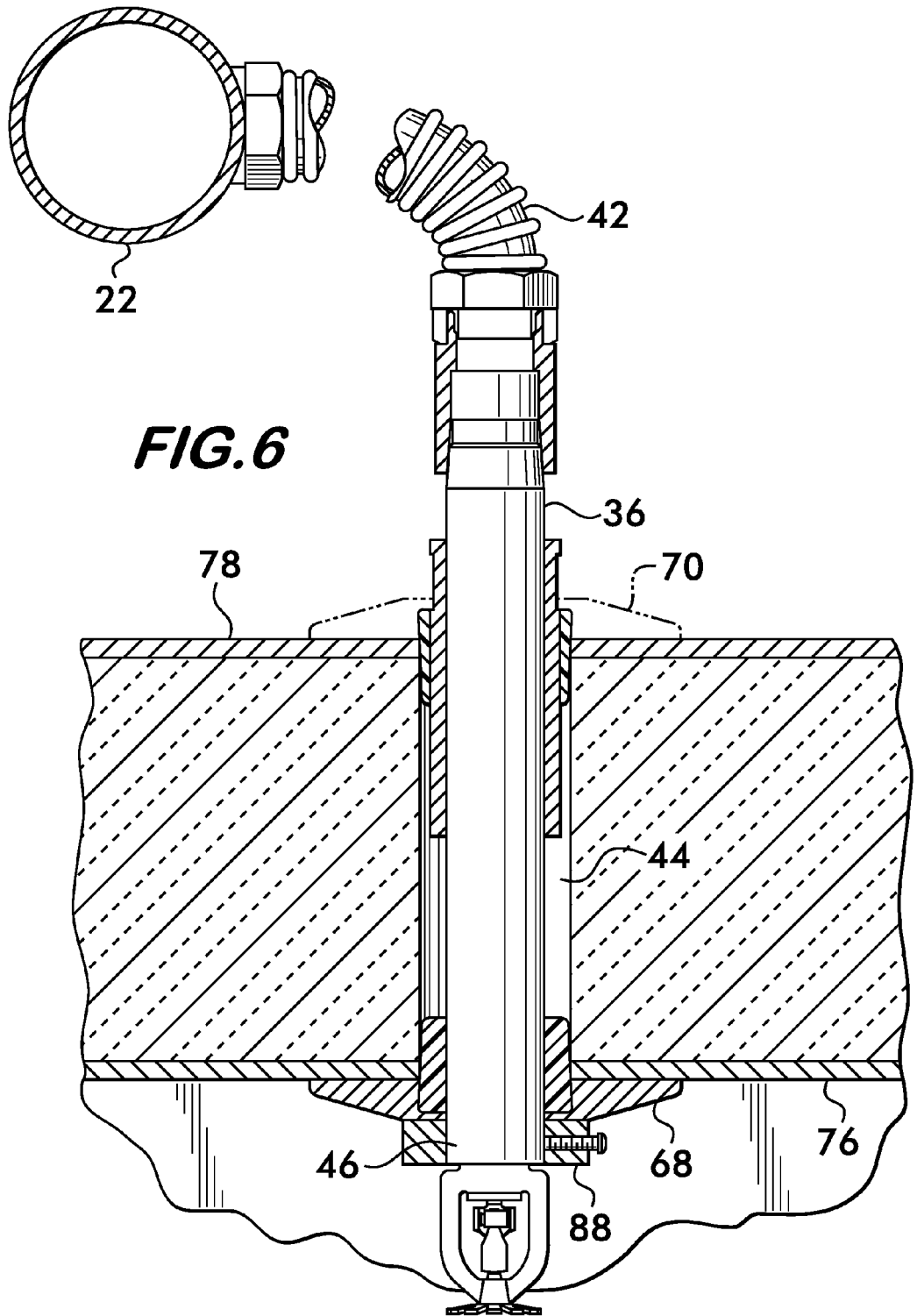
Figure 7:
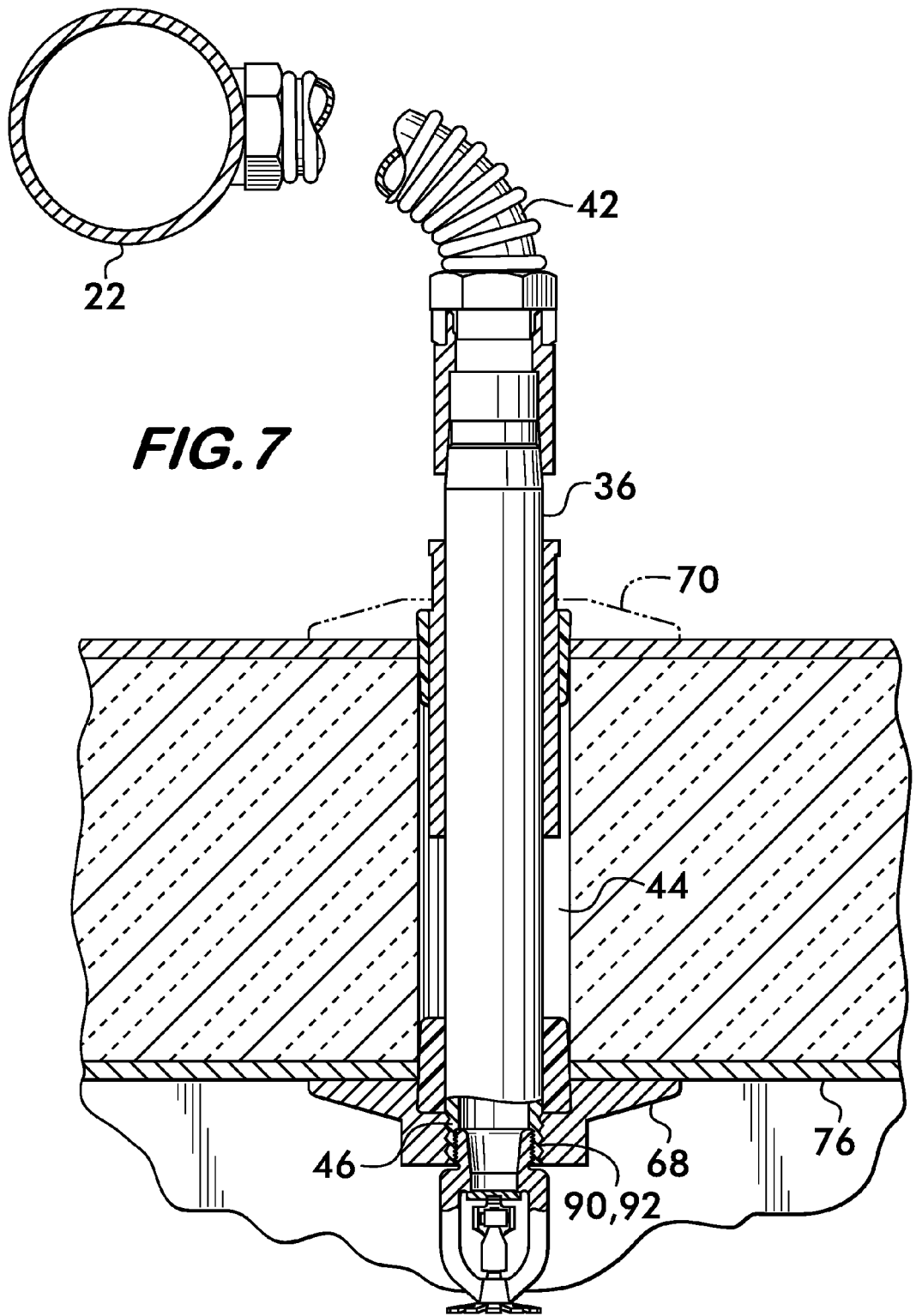

Another sprinkler assembly embodiment 82 is illustrated in FIG. 5 wherein the escutcheon 70 is secured to the conduit 36 threadedly by compatible screw threads 84 and 86 respectively positioned on the escutcheon and the conduit. Rotation of the escutcheon 70 when in contact with the substrate surface 78 draws the escutcheon 68 into contact with the opposite surface 76 and thereby supports the sprinkler assembly 82 on the substrate and between the escutcheons. Note that the escutcheon 68 is shown in phantom line, which indicates that it may be attached to the assembly in one of a number of ways. For example, FIG. 6 shows escutcheon 68 attached to the conduit 36 by a clamp 88, whereas FIG. 7 shows the escutcheon 68 threadedly attached to the conduit 36 by means of compatible screw threads 90 and 92 respectively on the escutcheon and the conduit 36. Note that in the example embodiments shown in FIGS. 6 and 7 the second end 46 of the conduit extends from the opening 44 beyond the surface 76 of the substrate. Escutcheon 70 is shown in phantom line in FIGS. 6 and 7 indicating that it could be mounted on the conduit 36 in any one of a number of ways which provide support to the assembly.

Figure 8:
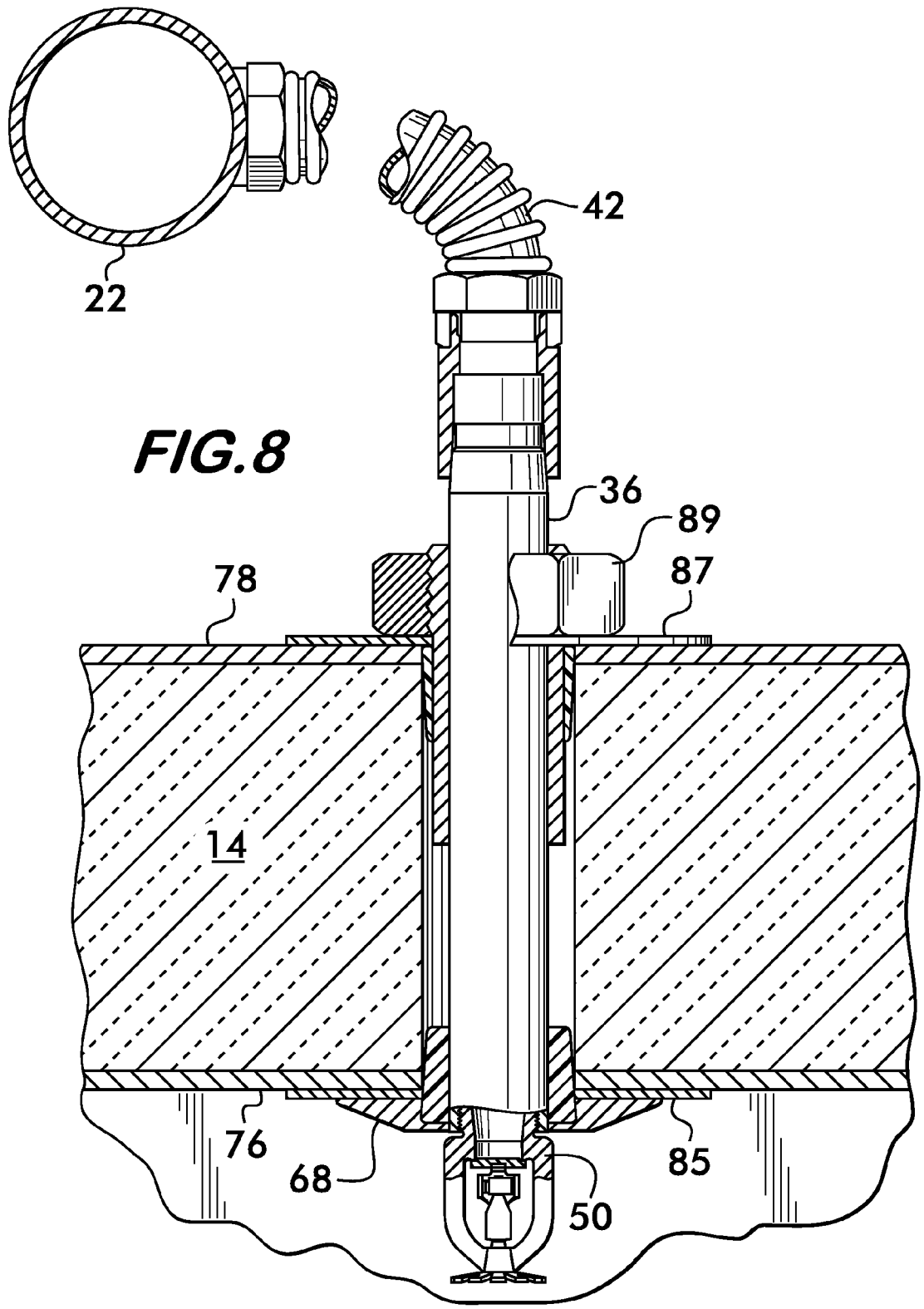

FIG. 8 shows a sprinkler assembly embodiment which uses plates 85, 87 in contact with the substrate surfaces 76 and 78, respectively, to help distribute loads imposed by the sprinkler assembly onto the substrate 14. As shown engaging surface 76, the plate 85 is captured between the surface and an escutcheon 68 mounted on the sprinkler 50. Plate 87, engaging opposite surface 78, is held in place against the surface by a hex nut 89 threaded to the conduit 36. Nut 89 acts as a compression nut to secure the sprinkler assembly to the substrate upon tightening.

Figure 4B:
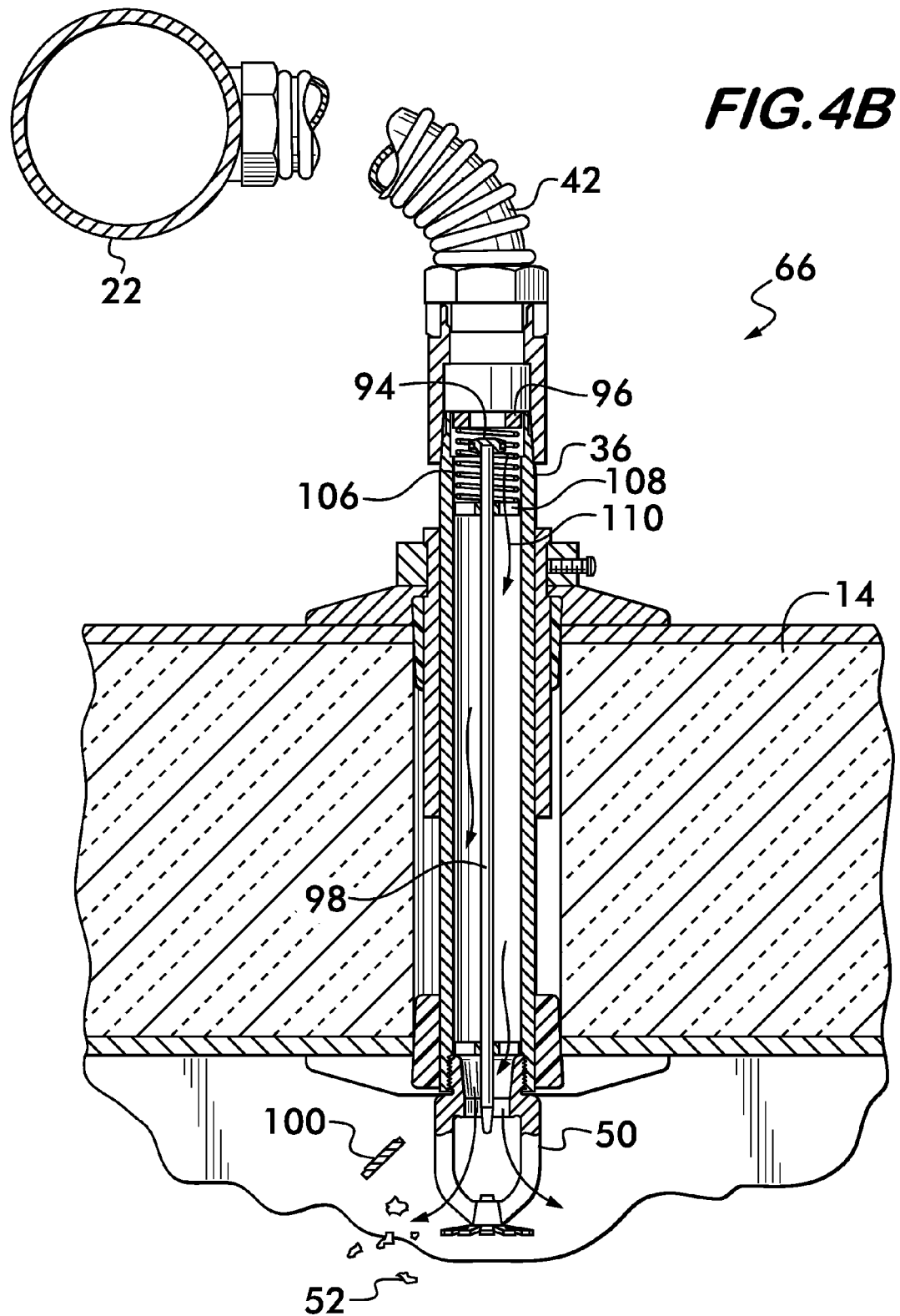

Operation of an example sprinkler assembly applicable to any of the feasible installations is described with reference to FIGS. 4A and 4B. As shown in FIG. 4A, the valve 54, positioned, in this example, within the conduit 36, is in its closed configuration which maintains the conduit 36 in a dry condition by keeping water or other fire suppressing fluid in the flexible hose 42 and the piping network 22. In the closed configuration, a valve closing member 94 is held in sealing engagement with a seat 96 positioned within the conduit 36 proximate to the first end 38 of the conduit 36 by a rod 98. Rod 98 extends from the valve closing member 94 through the conduit 36 to a cap 100 which covers the opening 102 of sprinkler 50. Cap 100 is held in position by the heat sensitive trigger 52, which is supported by the sprinkler arms 104. Heat sensitive trigger 52 may be, for example, a frangible glass bulb filled with a heat sensitive liquid, or a mechanism held together by a solder having a precisely defined melting temperature. Rod 98, and therefore the closing member 94 to which it is attached, are biased into the open configuration by a spring element 106 which acts between the seat 96 and a stabilizing spider 108 attached to the rod 98. As shown in FIG. 4B, when the heat from a fire causes the trigger 52 to break or fall apart it no longer supports the cap 100, which is subjected to the compression force of spring 106 and water pressure acting on valve closing member 94 through the action of rod 98. Cap 100, not being fixedly attached to any part of the sprinkler assembly, falls away and releases the rod 98. Rod 98, now unconstrained, moves toward the sprinkler 50 under the biasing force of spring 106 as well as the water pressure against the valve closing member 94 and thus allows the valve closing member to unseat and thereby permit water 110 to flow through the conduit 36 to be discharged from the sprinkler 50 onto the fire.

Sprinkler assemblies according to the invention permit greater flexibility in the design and construction of fire suppression systems by supporting the sprinkler assembly within the substrates forming the structure being protected, and not rigidly from the piping network.

What is claimed is:

1. In combination, a sprinkler assembly and a substrate, said sprinkler assembly connectable in fluid communication with a piping network carrying a fire suppressing liquid, said sprinkler assembly being extendable through an opening in said substrate, said sprinkler assembly and said substrate comprising:

a conduit having a first end connectable to said piping network on one side of said substrate and a second end positionable adjacent to an opposite side of said substrate;

a valve movable between a closed position preventing said liquid from entering said conduit, and an open position allowing said liquid to flow through said conduit;

a sprinkler mounted on said second end of said conduit;

a first and a second sleeve positioned within said opening and surrounding said conduit, said first and second sleeves each having an outwardly facing tapered surface in contact with an inwardly facing surface of said substrate within said opening and each said sleeve having an inwardly facing surface in contact with an outwardly facing surface of said conduit, said first sleeve positioned proximate to said first end of said conduit, said second sleeve positioned proximate to said second end of said conduit;

a compression nut positioned proximate to said first end of said conduit, said compression nut threadedly engaging said conduit and drawing said second sleeve toward said first sleeve thereby drawing said outwardly facing surfaces of said first and second sleeves into engagement with said inwardly facing surface of said substrate upon tightening of said compression nut against said substrate.

2. The combination according to claim 1, wherein said valve is positioned within said conduit.

3. The combination according to claim 1, wherein a portion of said sleeve extends from said opening, said assembly further comprising an escutcheon positioned on said opposite side of said substrate and surrounding said opening, said escutcheon engaging said portion of said sleeve.

4. The combination according to claim 1, further comprising an escutcheon positioned on said one side of said substrate and surrounding said opening, said escutcheon being mounted on said conduit.

5. The combination according to claim 4, wherein said escutcheon is threadedly attached to said conduit and comprises said threaded nut.

6. The combination according to claim 1, further comprising an escutcheon positioned on said opposite side of said substrate and surrounding said opening, said escutcheon being mounted on said sprinkler.

7. The combination according to claim 1, further comprising a flexible hose attached to said first end of said conduit for connecting said conduit to said piping network.

8. In combination, a sprinkler assembly and a substrate, said sprinkler assembly being connectable in fluid communication with a piping network carrying a fire suppressing liquid, said sprinkler assembly being extendable through an opening in said substrate, said sprinkler assembly and said substrate comprising:
 a conduit having a first end connectable to said piping network on one side of said substrate and a second end positionable adjacent to an opposite side of said substrate;
 a valve being movable between a closed position preventing said liquid from entering said conduit, and an open position allowing said liquid to flow through said conduit;
 a sprinkler mounted on said second end of said conduit;
 a first sleeve positioned within said opening and surrounding said conduit, said first sleeve being positioned proximate to said first end of said conduit, said first sleeve having an outwardly facing tapered surface in contact with an inwardly facing surface of said substrate within said opening and an inwardly facing surface in contact with an outwardly facing surface of said conduit;
 a second sleeve positioned within said opening and surrounding said conduit, said second sleeve being positioned proximate to said second end of said conduit and having an outwardly facing tapered surface in contact with said inwardly facing surface of said substrate within said opening and an inwardly facing surface in contact with an outwardly facing surface of said conduit;
 a compression nut positioned proximate to said first end of said conduit, said compression nut threadedly engaging said conduit and drawing said second sleeve toward said first sleeve thereby drawing said outwardly facing surfaces of said first and second sleeves into engagement with said inwardly facing surface of said substrate upon tightening of said compression nut against said substrate.

9. The combination according to claim 8, wherein said valve is positioned within said conduit.

10. The combination according to claim 8, further comprising a flexible hose attached to said first end of said conduit for connecting said conduit to said piping network.

11. A freezer, comprising:
 a compartment defined by a plurality of interconnected substrates;
 a piping network positioned outside of said compartment and supplying a fire suppressing liquid;
 at least one sprinkler assembly comprising:
 a conduit extending through an opening in one of said substrates, said conduit having a first end connected to said piping network on one side of said one substrate and a second end positioned adjacent to an opposite side of said one substrate;
 a valve being movable between a closed position preventing said liquid from entering said conduit, and an open position allowing said liquid to flow through said conduit;
 a sprinkler mounted on said second end of said conduit;
 a first and a second sleeve positioned within said opening and surrounding said conduit, said first and second sleeves each having an outwardly facing tapered surface in contact with an inwardly facing surface of said one substrate within said opening and each said sleeve having an inwardly facing surface in contact with an outwardly facing surface of said conduit, said first sleeve positioned proximate to said first end of said conduit, said second sleeve positioned proximate to said second end of said conduit;
 a compression nut positioned proximate to said first end of said conduit, said compression nut threadedly engaging said conduit and drawing said second sleeve toward said first sleeve thereby drawing said outwardly facing surfaces of said first and second sleeves into engagement with said inwardly facing surface of said one substrate upon tightening of said compression nut against said one substrate.

12. The freezer according to claim 11, wherein said valve is positioned within said conduit.

13. The freezer according to claim 11, wherein a portion of said sleeve extends from said opening inside said compartment, said freezer further comprising an escutcheon positioned on said opposite side of said one substrate, said escutcheon engaging said portion of said sleeve.

14. The freezer according to claim 11, further comprising an escutcheon positioned on said opposite side of said one substrate and surrounding said opening, said escutcheon being mounted on said sprinkler.

15. The freezer according to claim 11, further comprising a flexible hose having a first end attached to said first end of said conduit and a second end attached to said piping network.

16. A freezer, comprising:
 a compartment defined by a plurality of interconnected substrates;
 a piping network positioned outside of said compartment and supplying a fire suppressing liquid;
 at least one sprinkler assembly comprising:
 a conduit extending through an opening in one of said substrates, said conduit having a first end connected to said piping network on one side of said one substrate and a second end positioned adjacent to an opposite side of said one substrate;
 a valve being movable between a closed position preventing said liquid from entering said conduit, and an open position allowing said liquid to flow through said conduit;

a sprinkler mounted on said second end of said conduit;

a first sleeve positioned within said opening and surrounding said conduit, said first sleeve being positioned proximate to said first end of said conduit, said first sleeve having an outwardly facing tapered surface in contact with an inwardly facing surface of said one substrate within said opening and an inwardly facing surface in contact with an outwardly facing surface of said conduit;

a second sleeve positioned within said opening and surrounding said conduit, said second sleeve being positioned proximate to said second end of said conduit and having an outwardly facing tapered surface in contact with said inwardly facing surface of said one substrate within said opening and an inwardly facing surface in contact with an outwardly facing surface of said conduit;

a compression nut positioned proximate to said first end of said conduit, said compression nut threadedly engaging said conduit and drawing said second sleeve toward said first sleeve thereby drawing said outwardly facing surfaces of said first and second sleeves into engagement with said inwardly facing surface of said one substrate upon tightening of said compression nut against said one substrate.

17. The freezer according to claim 16, wherein said valve is positioned within said conduit.

18. The freezer according to claim 16, further comprising an escutcheon positioned on said opposite side of said one substrate and surrounding said opening.

19. The freezer according to claim 18, wherein a portion of said second sleeve extends from said opening, said escutcheon engaging said portion of said second sleeve.

20. The freezer according to claim 18, wherein said escutcheon is mounted on said sprinkler.

21. The freezer according to claim 16, further comprising a flexible hose having a first end attached to said first end of said conduit and a second end attached to said piping network.

22. The combination according to claim 8, further comprising an escutcheon positioned on said one side of said substrate and surrounding said opening, said escutcheon being mounted on said conduit.

23. The combination according to claim 22, wherein said escutcheon is threadedly attached to said conduit and comprises said threaded nut.

24. The freezer according to claim 11, further comprising an escutcheon positioned on said one side of said one substrate and surrounding said opening, said escutcheon being mounted on said conduit.

25. The freezer according to claim 24, wherein said escutcheon is threadedly attached to said conduit and comprises said threaded nut.

26. The freezer according to claim 16, further comprising an escutcheon positioned on said one side of said one substrate and surrounding said opening, said escutcheon being mounted on said conduit.

27. The freezer according to claim 26, wherein said escutcheon is threadedly attached to said conduit and comprises said threaded nut.

* * * * *